United States Patent
Ochi

(10) Patent No.: US 9,352,619 B2
(45) Date of Patent: May 31, 2016

(54) PNEUMATIC TIRE

(75) Inventor: Naoya Ochi, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 812 days.

(21) Appl. No.: 13/583,522

(22) PCT Filed: Mar. 4, 2011

(86) PCT No.: PCT/JP2011/001295
§ 371 (c)(1), (2), (4) Date: Sep. 7, 2012

(87) PCT Pub. No.: WO2011/111352
PCT Pub. Date: Sep. 15, 2011

(65) Prior Publication Data
US 2012/0325384 A1    Dec. 27, 2012

(30) Foreign Application Priority Data

Mar. 8, 2010 (JP) .................................. 2010-051080
Mar. 8, 2010 (JP) .................................. 2010-051088

(51) Int. Cl.
B60C 11/04 (2006.01)
B60C 11/11 (2006.01)
B60C 11/03 (2006.01)

(52) U.S. Cl.
CPC ......... B60C 11/0309 (2013.04); B60C 11/0304 (2013.04); B60C 11/11 (2013.01); *B60C 2011/0341* (2013.04); *B60C 2011/1213* (2013.04)

(58) Field of Classification Search
CPC ................ B60C 11/03; B60C 11/0304; B60C 11/0306; B60C 11/0309; B60C 11/033; B60C 11/0332; B60C 11/11; B60C 2011/1213; B60C 11/04
USPC .......... 152/209.8, 209.18, 209.25, 902, 209.1
See application file for complete search history.

(56) References Cited

U.S. PATENT DOCUMENTS 5,658,404 A * 8/1997 Brown et al. ............... 152/209.8
2011/0297282 A1* 12/2011 Ochi ....................... B60C 11/11
152/209.1

FOREIGN PATENT DOCUMENTS

CN    102395476 A    3/2012
EP    0 681 929 A1    11/1995
(Continued)

OTHER PUBLICATIONS

JP 2009-190558, Aug. 2009, English language machine translation [https://www.jplatpat.inpit.go.jp/web/all/top/BTmTopEnglishPage].*

(Continued)

*Primary Examiner* — Eric Hug
(74) *Attorney, Agent, or Firm* — Sughrue Mion, PLLC

(57) ABSTRACT

A pneumatic tire includes two circumferential main grooves within a ground-contact width of a tread, and a group of polygonal blocks between the two circumferential main grooves. The group of polygonal blocks includes a plurality of polygonal blocks arranged in at least two longitudinal rows in a tire circumferential direction and a plurality of transverse rows in a tire width direction. Each polygonal block has not less than five sides, and is defined by narrow grooves. The polygonal blocks in the adjacent longitudinal rows are arranged so as to be staggered from each other in the tire circumferential direction. The group of polygonal blocks has a widthwise center that is positioned within a 50% width region of the ground-contact width of the tread across a tire equatorial plane.

10 Claims, 6 Drawing Sheets

(56) References Cited

FOREIGN PATENT DOCUMENTS

| | | | |
|---|---|---|---|
| EP | 2 397 345 A1 | | 12/2011 |
| JP | 3-136911 | * | 6/1991 |
| JP | 8-002215 A | | 1/1996 |
| JP | 8-318710 A | | 12/1996 |
| JP | 2001-191739 | * | 7/2001 |
| JP | 2001-322408 A | | 11/2001 |
| JP | 2001-354010 A | | 12/2001 |
| JP | 2007-145209 | * | 6/2007 |
| JP | 2008-056057 A | | 3/2008 |
| JP | 2009-190558 | * | 8/2009 |
| JP | 2010-012931 A | | 1/2010 |
| JP | 2010-30466 | * | 2/2010 |
| JP | 2010-030466 A | | 2/2010 |
| JP | 2010-260437 A | | 11/2010 |
| WO | 96/36501 A1 | | 11/1996 |
| WO | 98/31555 A1 | | 7/1998 |
| WO | WO 2010/092742 | * | 8/2010 ............. B60C 11/11 |

OTHER PUBLICATIONS

JP 2010-030466, Feb. 2010, English language machine translation [https://www.jplatpat.inpit.go.jp/web/all/top/BTmTopEnglishPage].*
International Search Report of PCT/JP2011/001295, dated Mar. 29, 2011.
Japanese Office Action, dated Oct. 8, 2013, issued in corresponding Japanese Patent Application No. 2010-051080.
Japanese Office Action, dated Oct. 8, 2013, issued in corresponding Japanese Patent Application No. 2010-051088.
Extended European Search Report, dated Jan. 3, 2014, issued in corresponding European Patent Application No. 11753018.8.
Chinese Office Action, dated Sep. 25, 2014, issued in Chinese Patent Application No. 201180023204.1.

* cited by examiner

Cross section along line P-P

PNEUMATIC TIRE

CROSS REFERENCE TO RELATED APPLICATIONS

This application is a National Stage of International Application No. PCT/JP2011/001295 filed Mar. 4, 2011, claiming priority based on Japanese Patent Application Nos. 2010-051088, filed Mar. 8, 2010 and 2010-051080 filed Mar. 8, 2010, the contents of all of which are incorporated herein by reference in their entirety.

TECHNICAL FIELD

The present invention relates to a pneumatic tire comprising two circumferential main grooves within a ground-contact width of a tread, and a group of polygonal blocks between the two circumferential main grooves, in which the group of polygonal blocks is comprised of a plurality of polygonal blocks arranged in at least two longitudinal rows in a tire circumferential direction and a plurality of transverse rows in a tire width direction, the polygonal blocks each having not less than five sides and being defined by narrow grooves.

BACKGROUND ART

In order to provide improved driving-, braking- and turning-performance of a pneumatic tire on icy or snowy road surfaces and wet road surfaces, there has been conventionally used a tread pattern as shown in FIG. 6. In this instance, triangular blocks and quadrangular blocks having substantially the same dimension are uniformly defined on the tread ground-contact surface, by main grooves and widthwise grooves. Moreover, sipes are generally provided in the defined blocks so as to improve the performance on icy or snowy road surfaces through a so-called edging effect.

When sipes are formed as described above for improving the edging effect, there is an instance wherein the blocks divided by the sipes undergo buckling upon contact with the ground. Thus, the triangular blocks and quadrangular blocks are generally designed to have a uniform, relatively large ground-contact area, to thereby provide an improved ground-contact property and secure performance on icy or snowy ground.

Attention is drawn to Patent Document 1: JP 2008-56057A.

DISCLOSURE OF THE INVENTION

Problems to be Solved by the Invention

However, when the block pattern with a relatively large ground-contact area is uniformly arranged on the ground-contact surface of the tread, the rigidity of the block as a whole is increased and it becomes difficult for each block to secure a sufficient flexibility when contacting with the ground. Consequently, with the above-described constitution of the block pattern alone, it proves not easy to realize a sufficient road-following capability of the blocks, particularly upon stepping-in and kicking-out.

In recent years, demand for even higher performance of the vehicle has been increasing. Therefore, for a pneumatic winter tire mainly focused to driving on icy and snowy road surfaces, it is required to realize not only an improved performance on icy and snowy roads, but also an efficient road following capability, such that various performances as required for tires are simultaneously satisfied in a well-balanced manner.

In view of these requirements, the inventors conducted thorough investigations and found that an arrangement of closely-spaced polygonal blocks with not less than five sides and having a relatively small ground-contact area serves to improve tire performance on icy and snowy roads, and also to secure better road following capability of the blocks, as compared to a conventional arrangement of the triangular and quadrangular blocks within the ground-contact surface of the tread. This is because the polygonal blocks as noted above contributes to increase the total length and number of the edges, and provide each block with more flexible deformability than ever before, upon rolling of a loaded tire.

However, in the shoulder region of the tread portions (i.e., outer regions in the tread width direction), the tread surface is pressed against the flat road surface so as to stretch belt layers on the radially inner side in the shoulder region, and the tread surface having been stretched then restores to the original shape when the tread surface is moved away from the road surface. In this way, during rolling of a tire, deformation of the blocks is repeated in the shoulder region. It is known in this connection that shoulder wear and step-down wear tend to occur especially in the block land portion of the shoulder region due to such deformation. Thus, when the polygonal blocks are simply arranged all across the tread ground-contact surface uniformly, there is a concern that among the plurality of polygonal blocks, particularly those positioned in the shoulder region may be subjected to an accelerated wear.

Also, when a plurality of polygonal blocks are closely spaced, the groove width becomes narrow and the groove shape must be of complicated non-linear shape, thereby making it difficult to maintain a satisfactory drainage performance. Thus, there is a further concern that the drainage performance of the tire as a whole may deteriorate due to the arrangement of the polygonal blocks uniformly across the ground-contact surface of the tread.

Therefore, it is an object of the present invention to provide a pneumatic tire having an optimum tread pattern so as to provide a balanced matching of an improved performance on icy and snowy ground and various other required necessary performances, thereby exhibiting each tire performance and preventing uneven wear in the shoulder regions.

Means for Solving the Problems

In order to achieve the above-mentioned object, the inventors realized that various performances such as the performance on icy and snowy roads, the road following capability, the drainage performance, etc. are all important in terms of the tire function, though the importance of each necessary performance is not always equal across the tread ground-contact surface, but varies in each region of the ground-contact surface of the tread, depending on the direction of an installed tire during rolling under load and the conditions of a ground-contact surface.

Then, the inventors reached a conception that the more effective tread pattern exhibiting various necessary performances in a well-balanced manner in a tire as a whole could be realized by arranging the polygonal blocks not only equally across the tread ground-contact surface, but also in the optimum position within the tread ground-contact surface, depending on the purpose of use of an installed tire, taking into consideration the above-mentioned fact and each region's property within the ground-contact surface of the tread.

According to the present invention, there is provided a pneumatic tire comprising two circumferential main grooves within a tread ground-contact width, and a group of polygonal blocks between the two circumferential main grooves, in which the group of polygonal blocks is comprised of a plurality of polygonal blocks arranged in at least two longitudinal rows in a tire circumferential direction and in a plurality of transverse rows in a tire width direction, the polygonal blocks each having not less than five sides and being defined by narrow grooves, wherein the polygonal blocks in the adjacent longitudinal rows are arranged so as to be staggered from each other in the tire circumferential direction; and the group of polygonal blocks having a widthwise center that is positioned within a fifty-percent-wide region of the tread ground-contact width across a tire equatorial plane.

As used herein, the phrase "tread ground-contact width" refers to the maximum width of a tire surface in contact with the ground, in the case of a pneumatic tire which is installed to a standard rim as defined according to an applicable industrial standard of a country where a tire is produced or utilized, such as the "YEAR BOOK" (The Tire and Rim Association Inc.) in the U.S., the "STANDARD MANUAL" (The European Tyre and Rim Technical Organisation) in Europe, as well as the "JATMA YEAR BOOK" (Japan Automobile Tire Manufactures Association) in Japan, and which is inflated by the air pressure corresponding to the maximum load (i.e., the maximum load capacity) for a single tire under the applied size as designated in the above mentioned standards.

Also, the term "longitudinal row" refers to a row comprised of polygonal blocks that are arranged at predetermined intervals in the tire circumferential direction, in at least two or more longitudinal rows arranged side-by-side in the tire width direction.

The phrase "the polygonal blocks arranged so as to be staggered from each other in the tire circumferential direction" means that a plurality of identically-shaped polygonal blocks forming adjacent longitudinal rows are arranged in a zigzag pattern, as being offset in the circumferential direction.

The term "widthwise center of the group of polygonal blocks" refers to a center of the region where the polygonal blocks are closely spaced. Thus, when the polygonal blocks are arranged in a plurality of rows, the widthwise center of the group of polygonal blocks is the center between two lines passing the respective widthwise outmost points of the two polygonal block rows positioned outermost in the tire width direction, and extending in parallel to the tire equatorial plane.

In the pneumatic tire according to the present invention, it is preferred that the widthwise center of the group of polygonal blocks is arranged with an offset relative to the tire equatorial plane. The phrase "arranged with an offset relative to the tire equatorial plane" means that the widthwise center of the group of polygonal blocks is not positioned on the tire equatorial plane but shifted to either one of half-tread-width regions.

In the pneumatic tire according to the present invention, furthermore, it is preferred that the polygonal blocks are arranged only within a half-tread-width region. The term "half-tread-width region" refers to each region obtained by dividing the tread portion into two equal parts on both sides of the tire equatorial plane.

In the pneumatic tire according to the present invention, wherein the installation direction of the tire is predetermined relative to a vehicle, it is preferred that the widthwise center of the group of polygonal blocks of an installed tire is positioned within the half-tread-width region on the inner side or outer side of the vehicle. Here, the phrase "installation direction of the tire is predetermined relative to a vehicle" means that some indicators for users, such as characters, marks, patterns, etc. indicating the installation direction are applied to an outer surface of the tire.

In the pneumatic tire according to the present invention, it is preferred that side block rows each comprised of a plurality of side blocks defined by the circumferential main grooves, widthwise grooves and the narrow grooves and oriented in the tire circumferential direction, are arranged on both sides of the group of polygonal blocks in the tire width direction, respectively. Here, the term "widthwise groove" refers to a groove transversely crossing the circumferential narrow grooves positioned on the outer side of the outmost polygonal block in the tire width direction, and also crossing the circumferential main grooves.

In the pneumatic tire according to the present invention, it is preferred that the width of the group of polygonal blocks and the side block row in the tire width direction is within a range from 7.5% to 50% of the ground-contact width of the tread. Here, the term "width of the group of polygonal blocks and the side block row in the tire width direction" refers to the length of a line segment passing the points of the two circumferential main grooves for defining the side blocks, which points are positioned on the sides of each group of polygonal blocks.

In the pneumatic tire according to the present invention, it is preferred that the narrow groove defining the group of polygonal blocks is smaller in depth than the circumferential main groove.

In the pneumatic tire according to the present invention, it is preferred that an actual ground-contact area of each polygonal block is within a range from 50 mm$^2$ to 250 mm$^2$. Here the term "actual ground-contact area" refers to a surface area of the polygonal block under unloaded condition.

In the pneumatic tire according to the present invention, it is preferred that the group of polygonal blocks has a block density S with reference to a unit actual ground-contact area, as represented by the number "a" of the polygonal blocks within a reference area of the group of polygonal blocks, the reference area being defined by a reference pitch length PL (mm) and a width GbW (mm) of the group of polygonal blocks; wherein the block density S is expressed as:

$$S=a/(PL \times GbW \times (1-N/100))$$

where N (%) is a negative ratio within the reference area; and wherein the block density S is within a range from 0.003 piece/mm$^2$ to 0.04 piece/mm$^2$.

Here, the term "reference pitch length of the group of polygonal blocks" means the smallest unit of a repeated pattern of the polygonal blocks in one longitudinal row forming the group of polygonal blocks within the ground-contact width of the tread. For instance, in case the repeated pattern is specified by one polygonal block and a groove defining the polygonal block, the reference pitch length of the polygonal block is calculated by adding the circumferential length of one polygonal block and the circumferential length of one groove adjacent to the polygonal block in the tire circumferential direction.

The term "width of the group of polygonal blocks" refers to the length of the group of polygonal blocks in the tire width direction within the ground-contact width of the tread.

The term "actual ground-contact area" refers to the total surface area of the entire polygonal blocks within the reference area, e.g. an area obtained by subtracting the surface areas of the grooves defining each polygonal block from the above reference area defined by multiplying the reference pitch length PL by the width of the group of polygonal blocks GbW.

In the pneumatic tire according to the present invention, it is preferred that at least one of the circumferential main grooves includes blocks with a raised bottom. Here, the term "raised bottom blocks" refers to blocks formed in the groove having a raised bottom, one side of which as seen in the tire width direction is connected with the side block, and a height that is lower than the side block.

Effects of the Invention

According to the present invention, the property of each region within the tread ground-contact surface is taken into consideration depending on the running conditions, making it possible to provide a pneumatic tire with an optimum tread pattern exhibiting both the performance on icy and snowy roads and other various necessary performances, and preventing uneven wear in the should region.

BEST MODE FOR CARRYING OUT THE INVENTION

Figure 1:
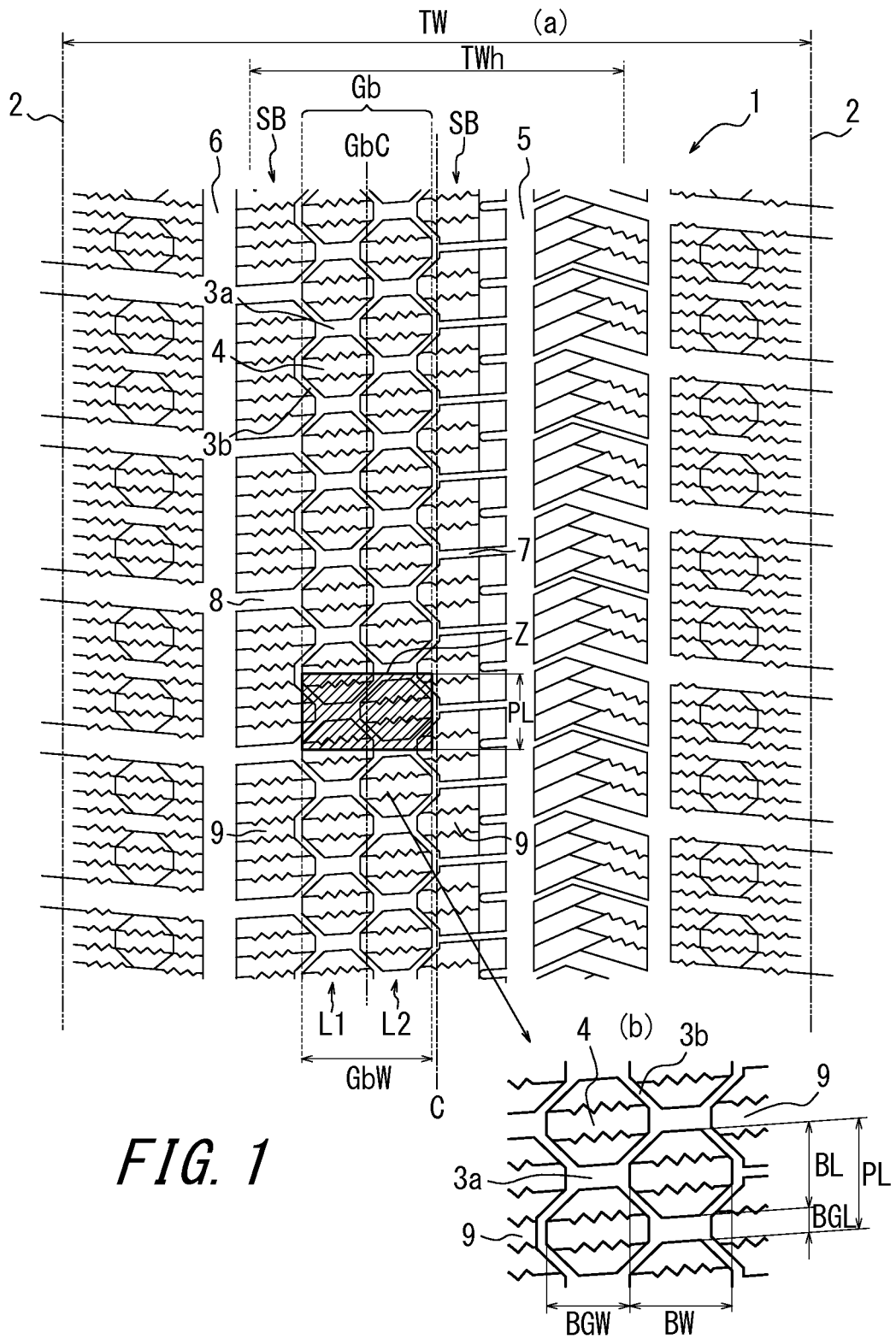
FIG. 1(a) is a partial exploded view showing the tread pattern of a pneumatic tire according to one embodiment of the present invention.
FIG. 1(b) is an enlarged plan of a part of FIG. 1(a)

The present invention will be further described with reference to preferred embodiments shown in the accompanying drawings. Here, FIG. 1 is a partial exploded view showing the tread pattern of a pneumatic tire (referred to as "tire" below) according to an embodiment of the present invention. It is noted that in the drawings, the longitudinal direction shows the tread circumferential direction and the transverse direction (the direction perpendicular to the equatorial plane C) indicates the tread width direction.

As shown in FIG. 1, in a portion of the tread region between tread ground-contact edges 2, 2 of a tire 1, a group of polygonal blocks Gb is positioned by arranging a plurality of polygonal blocks 4 so close each other, wherein the polygonal blocks 4 (hereinafter, referred simply to as "polygonal block") having not less than five sides are defined by a first narrow groove 3a and a second narrow groove 3b. Here, the "first narrow groove 3a" refers to a substantial widthwise groove between the polygonal blocks and the "second narrow groove 3b" refers to a groove crossing the first narrow groove 3a. It is preferred that these grooves are within a range of 0.7 mm to 3.0 mm so that the adjacent polygonal blocks can move independently without being completely tied up each other.

In the tire according to this embodiment, as described above, the group of polygonal blocks Gb is formed by arraigning the polygonal blocks 4 so closely spaced, while ensuring a sufficient negative rate of the group of polygonal blocks Gb. Thus, this constitution contributes to increase the total edge length and the edge direction (the edge numbers heading in different directions) of each block and to fulfill the excellent edging effect. Therefore, the driving performance on icy and snowy roads can be greatly improved. Also, as the blocks are formed by grooves instead of sipes, each polygonal block can move independently while being closely spaced, thereby enabling the polygonal blocks to deform flexibly upon contact with the ground. Therefore, the ground-contact property of the tread can be improved and consequently, the driving performance on icy and snowy roads also can be enhanced more effectively.

The polygonal blocks 4 are formed by a plurality of longitudinal rows arranged at a predetermined intervals in the tire circumferential direction, preferably at least in two or more longitudinal rows in the tire circumferential direction. In addition, the polygonal blocks 4 forming adjacent longitudinal rows are arranged so as to be staggered in the tire circumferential direction, namely in a zig-zag pattern (staggered grid) in the tire circumferential direction.

The phrase "being staggered in the tire circumferential direction" means that the centroids of polygonal blocks forming the adjacent longitudinal rows are not placed on the same straight line in the tire width direction. FIG. 1 shows an example, in which the centroids of a polygonal block row L1 and an adjacent polygonal block row L2 are arranged in a half-block shifted way in the tire circumferential direction. Thus, under the circumstances shifted with a half-block displacement in the tire circumferential direction within a plurality of longitudinal rows, the polygonal blocks forming every other longitudinal row are arranged in a same phase in the tire width direction (i.e., with the centroids on the same straight line) within the tread surface arrangement of a plurality of the polygonal blocks in the tire width direction.

However, the longitudinal rows in the tire circumferential direction are not necessarily shifted with a half-block displacement as described above. Therefore, though it is not shown in the drawing, the polygonal blocks arranged in a same phase are not necessarily placed in every other longitudinal row but can be placed in every a plurality of longitudinal rows.

By arranging the polygonal blocks of the group of polygonal blocks in a staggered layout and in a closely-spaced pattern, the space on the tread surface can be utilized effectively so that the more effective edging effect can be realized through the sequential edging effect of each block forming a larger number of the polygonal blocks upon rolling of a tire. Also by this shifted arrangement, the ground-contact timing can be staggered between the adjacent blocks in the tread width direction, thereby reducing the pattern noise.

It is preferred that in the group of polygonal blocks Gb of the tire 1, a relatively small block having an actual ground-contact area within a range of 50 $mm^2$ to 250 $mm^2$ respectively is arranged.

By means of the relatively small blocks, the block rigidity is reduced, while the flexibility is increased so that the tread ground-contact property and the driving performances (such as braking, traction, cornering etc.) on icy and snowy roads can be improved particularly. Moreover, by arranging the relatively small blocks, it can be also possible to shorten the distance from the block central area to the block peripheral area, thereby improving the effect for removing the water membrane by the polygonal blocks 4. Therefore, according to the tire of this embodiment, the driving performance on icy and snowy roads can be dramatically improved by ensuring the efficient ground-contact property and the edging effect and also realizing the effective removal of water membrane. Namely, when smaller than 50 mm², the dry performance/wet performance and performance on icy and snowy roads will deteriorate due to buckling caused by the reduced bending rigidity of the blocks, which are high (deep grooves) against the surface area. If larger than 250 mm², it will be difficult to ensure the sufficient flexibility of the blocks as mentioned above. The smaller the blocks become, the more difficult it is to improve the driving performance on icy and snowy roads. In case each block is enlarged, the drainage resistance caused by the polygonal blocks will be increased and thus, the hydroplaning performance gets worse.

In the group of polygonal blocks Gb of the tire 1, it is preferred that the group of polygonal blocks has a block density S with reference to a unit actual ground-contact area, as represented by the number "a" of the polygonal blocks within a reference area of the group of polygonal blocks, the reference area being defined by a reference pitch length PL (mm) and a width GbW (mm) of the group of polygonal blocks; wherein the block density S is expressed as:

$$S=a/(PL \times GbW \times (1-N/100))$$

where N (%) is a negative ratio within the reference area; and wherein the block density S is within a range from 0.003 piece/mm² to 0.04 piece/mm².

Because it is difficult to realize the high edging effect without forming sipes, when the block density S of the polygonal blocks is less than 0.003 piece/mm². On the other hand, when the block density S of polygonal blocks is more than 0.04 piece/mm², it is also difficult to realize the desired block rigidity due to the small dimension of the polygonal blocks.

When counting the number of polygonal blocks "a" within the reference area Z, there is a case that a block is placed astride both inside and outside the reference area Z and cannot be counted as one block. This type of block should be counted based on the proportion of its remaining area within the reference area Z against its total area. For instance, a block placed astride inside and outside the reference area Z keeps only the half area within the reference area Z, this block can be counted as ½ piece.

In the formula shown above, the "reference pitch length" indicates the smallest unit of a repeated pattern of the polygonal blocks 4 in one longitudinal block row forming the group of polygonal blocks Gb. For example, when the repeated pattern of one polygonal block 4 is specified by the first narrow groove 3a and the second narrow groove 3b, forming the polygonal block 4, the reference pitch length can be obtained by adding the circumferential length of one polygonal block 4 and the circumferential length of one narrow groove 3a adjacent to the polygonal block 4 in the tire circumferential direction.

The term "actual ground-contact area" of the group of polygonal blocks refers to the total surface area of all the polygonal blocks arranged within the reference area. For instance, the actual ground-contact area can be obtained by subtracting the surface area of the first narrow groove 3a and the second narrow groove 3b, forming each polygonal block, from the above reference area to be defined by multiplying the reference pitch length PL by the width of the group of polygonal blocks GbW In addition, within the tread region between the tread ground-contact edge 2, 2 of the tire 1 on both sides of the group of polygonal blocks formed as above, blocks (hereinafter referred to as a "side blocks 9) are arranged in the tire circumferential direction, the side blocks 9 formed by the circumferential main grooves 5, 6, the widthwise grooves 7, 8 and the first and second narrow grooves 3a, 3b.

The side blocks 9 are arranged between the group of polygonal blocks Gb and the circumferential main grooves 5, 6, forming each one block row SB and SB respectively. As the example shown in FIG. 1, block shapes of the side blocks 9 adjacent to the group of polygonal blocks Gb are formed in a zigzag pattern corresponding with the shape of the polygonal blocks 4, while block shapes adjacent to the circumferential main grooves 5, 6 are preferably formed in a straight line, so as to compose the circumferential main grooves 5, 6 in a straight line. By forming the circumferential main grooves in a straight line, not only the drainage performance but also the straight driving stability can be improved. On the other hand, by forming zigzag grooves adjacent to the group of polygonal block Gb, corresponding with the shape of the polygonal blocks 4, the grooves of the same shape and same width with the grooves around the polygonal blocks 4 (i.e., same with the narrow grooves 3a and 3b) can be secured between the polygonal blocks 4 and the side blocks 9, which enables the polygonal blocks adjacent to the side blocks to obtain the same effect with the polygonal blocks arranged in other regions.

The side blocks 9 are formed so as to have a larger ground-contact area compared with the polygonal blocks 4. Upon load to a tire, the blocks in the shoulder side are buckle due to the load in cornering and from the rim, and also load is applied to the blocks in the tread center by the force from the outside into the inside in the tire width direction. In such a case, by increasing the ground-contact area of the side blocks surrounding the group of polygonal blocks Gb in the circumferential direction, and thus increasing the block rigidity as described above, the side blocks 9 can absorb the force from the outside in the tire width direction and suppress the force from the outside to the polygonal blocks 4 positioned closer to the tread center than the side blocks. As a result, the polygonal blocks arranged between the side blocks 9, 9 can hug the road surface in a good condition and the driving performance on icy and snowy roads can be realized effectively as mentioned above.

It is preferred that the actual ground-contact areas of the side blocks 9, 9 arranged on both sides of the group of polygonal block Gb have a different dimension respectively. As mentioned above, the blocks in the shoulder side are buckle by the load in cornering and from the rim, and thereby the blocks arranged more outside in the tire width direction tend to be subject to the force from the outside into the inside in the tire width direction. Therefore it is preferred that the side blocks arranged in the outer side in the tire width direction within the blocks on both sides across the group of polygonal blocks Gb have a larger actual ground-contact area. By increasing the block rigidity of the side blocks, the lateral force load to the polygonal blocks in the inner side in the tire width direction can be reduced. The opposite side blocks on the inner side in the tire width direction shall have a smaller actual ground-contact area than the side blocks in the outer side in the tire width direction. In case large blocks are arranged on both sides of the polygonal blocks, the polygonal blocks between the large blocks cannot move flexibly, therefore the above mentioned performance on icy and snowy roads cannot be realized efficiently. Thus, by placing smaller side blocks in one side and increasing the edging element, the traction performance on icy and snowy roads and the braking performance can be improved in a similar way as the adjacent polygonal blocks.

It is preferred that the width of the widthwise grooves forming the side blocks is within a range of 1 mm to 8 mm. And as described above, in case that the actual ground-contact widths of the side blocks in the tire width direction are different, it is preferred to reduce the number of the widthwise grooves between the larger side blocks, while making the width thereof larger than the widthwise grooves between the smaller side blocks. In the example shown in FIG. 1, the width of the widthwise grooves 8 between the larger side blocks are larger than the widthwise grooves 7 between the smaller side blocks. In particular, the width of the widthwise grooves between the larger side blocks is preferred to be within a range of 3 mm to 8 mm, because the traction braking performance on icy and snowy roads can be improved by securing the groove volume. It is preferred that the width of the widthwise grooves between the smaller side blocks is within a range of 1 mm to 5 mms wide, thereby improving the block rigidity of the smaller side blocks due to the narrow grooves. In this way, the width of the widthwise grooves can be varied depending on the targeted performance of the tire.

Regarding the polygonal blocks and the side blocks, it is preferred to form sipes according to the example shown in FIG. 1. By forming sipes, it becomes possible to improve the water removing effect and thus to enhance the performance on icy and snowy roads. The ground-contact performance can be also improved by means of the edging effect of each block. Thanks to the increased tread flexibility, the ground-contact performance can be improved, also. However, such sipes does not necessarily need to be formed and can be formed if desired, as the rigidity of each block can be increased also by not forming sipes and preventing the blocks from buckling.

In the pneumatic tire according to the present invention, as shown in FIG. 1, the widthwise center of the group of polygonal blocks GbC of the group of polygonal blocks Gb is positioned within the 50% wide region of the tread ground-contact width TWh, comprising 50% width of the tread ground-contact width TW (the tread width between the tread ground-contact edges 2, 2) across the tire equatorial plane C. Thus, the widthwise center of the group of polygonal blocks GbC of the group of polygonal blocks Gb is placed within 25% width of each tread ground-contact width, as seen from the tread center to the right and left tread regions, and therefore the group of polygonal blocks is positioned close to the tread center.

As described before, uneven wear tends to occur in the tread shoulder region and its generating mechanism shall be briefly explained below. When the tire is subject to load, the perpendicular force will be applied from the rim to the tread surface. After passing through the bead section and the side wall section, this perpendicular force will be transmitted via the shoulder region as the lateral force to the tread center in the inward direction of the substantial tire width. When this lateral force being transmitted, the blocks in the tread section will be subject to the inward force in the width direction, causing sharing deformation mostly in the blocks adjacent to the road surface (i.e., blocks in the shoulder region), which are arranged in the outer side of the tire width. The blocks in the shoulder region of the outer side in the tire width direction, especially the blocks in the closest region to the ground-contact edges tend to deform easiest, not only in receiving load but also in cornering.

By arranging the group of polygonal blocks not in the shoulder region but close to the tread center, the impact to the polygonal blocks by the lateral force can be reduced. And thus, the unique performances such as the performance on icy and snowy roads and the road following capability can be fulfilled. In other words, because no polygonal blocks are arranged in the shoulder region, where the polygonal blocks tend to generate shear deformation easiest, the polygonal blocks in other region become hardly worn. Therefore, the shape of the polygonal blocks can be maintained for a long period. And also, the equatorial plane C as the tread center is arranged within the region with the high ground-contact probability both in driving perpendicular to the road surface and in cornering with the tilt angles. Thus, the widthwise center of the group of polygonal blocks GbC of the group of polygonal blocks Gb is arranged within the 50% wide region of the tread ground-contact width TW across the tire equatorial plane C. Therefore, the group of polygonal blocks is placed close to the equatorial plane C, thereby realizing the performance on icy and snowy roads and the road following capability in the tread center region effectively.

Moreover, when the vehicle constitution is set up with a camber angle such as negative and positive cambers in accordance with load and aging variety of a tire installed at a vehicle, the tread ground-contact frequency and the load to the tread will vary on inner side and outer side of a vehicle. Namely, in case of the negative camber, the tread portion on inner side of a vehicle is in strong contact with the road surface, while the tread portion on outer side of a vehicle tends to be lifted up from the road surface. In case of the positive camber on the contrary, the tread portion on outer side is in strong contact with the road surface, while the tread portion on inner side tends to be lifted up.

As shown in FIG. 1 of the tire according to the present invention, the widthwise center of the group of polygonal blocks GbC of the polygonal blocks Gb is arranged with an offset relative to the equatorial plane C in the arrangement of polygonal blocks. Namely, the group of polygonal blocks Gb is positioned with an asymmetrical length in the tire width direction relative to the equatorial plane C on the tread ground-contact surface and the widthwise center of the group of polygonal blocks GbC is placed within the tread ground-contact width except the equatorial plane C.

In this way, by selecting the arrangements of the blocks depending on the situation and direction in driving, the polygonal blocks can be arranged in the ground-contact surface, which contacts with the road surface quite often. Thus, the polygonal blocks can move independently, realizing the high excellent edging effect. Therefore, in particular the performance on icy and snowy roads and the road following capability can be improved. Also, this selective arrangement of the blocks enables the other tread regions to maintain other necessary tire performances (such as the road hugging property and the hydroplaning performance). As described above, depending on a performance required according to a tread region respectively, each block with the different capability can be arranged properly, thereby providing an even better pneumatic tire combining various tire performances as a whole.

It is more preferred that all the polygonal blocks 4 forming the group of polygonal blocks Gb are arranged only in either one of half-tread-width regions. Concretely speaking, as shown in FIG. 1, when the tread ground-contact width TW between ground-contact edges 2, 2 in the tread surface is divided at the equatorial plane C to right and left on the paper plane, all the polygonal blocks 4 of the group of polygonal blocks Gb shall be arranged in either the right region or the left region.

In a vehicle comprising a camber angle, one tread portion on either inner or outer side of a vehicle will contact with the road surface more frequently. Therefore the performance on icy and snowy roads and the road following capability can be improved more effectively by arranging all the polygonal blocks 4 in the half-tread-width region contacting with the road surface more frequently, because the number of edges within this tread region will be increased and each block can move independently. In the other side of the half-tread-width region, other tire performances such as the road hugging property etc. can be realized by arranging the normal (conventional) block patterns thoroughly.

As mentioned above, if the group of polygonal blocks is arranged in the tread region contacting with the road surface less frequently during running without considering the existence of a camber angle, the effect of the polygonal blocks to improve the performance on icy and snowy roads etc. cannot be utilized effectively. Worse yet, there is a possibility that the tire rigidity might deteriorate as a whole due to the dense arrangement of the polygonal blocks even in the tread region with the less road-touching frequency and the road hugging property cannot be maintained in a good condition as a whole. There is also a possibility that the hydroplaning performance cannot be kept in a good condition, as the drainage performance gets worse by the arrangement of many complicatedly-shaped polygonal blocks across the tread surface. Consequently, depending on a performance required according to a tread region respectively, each block with a different capability should be selected and arranged properly. Therefore, an even better pneumatic tire combining various tire performances can be realized as a whole.

Figure 2:
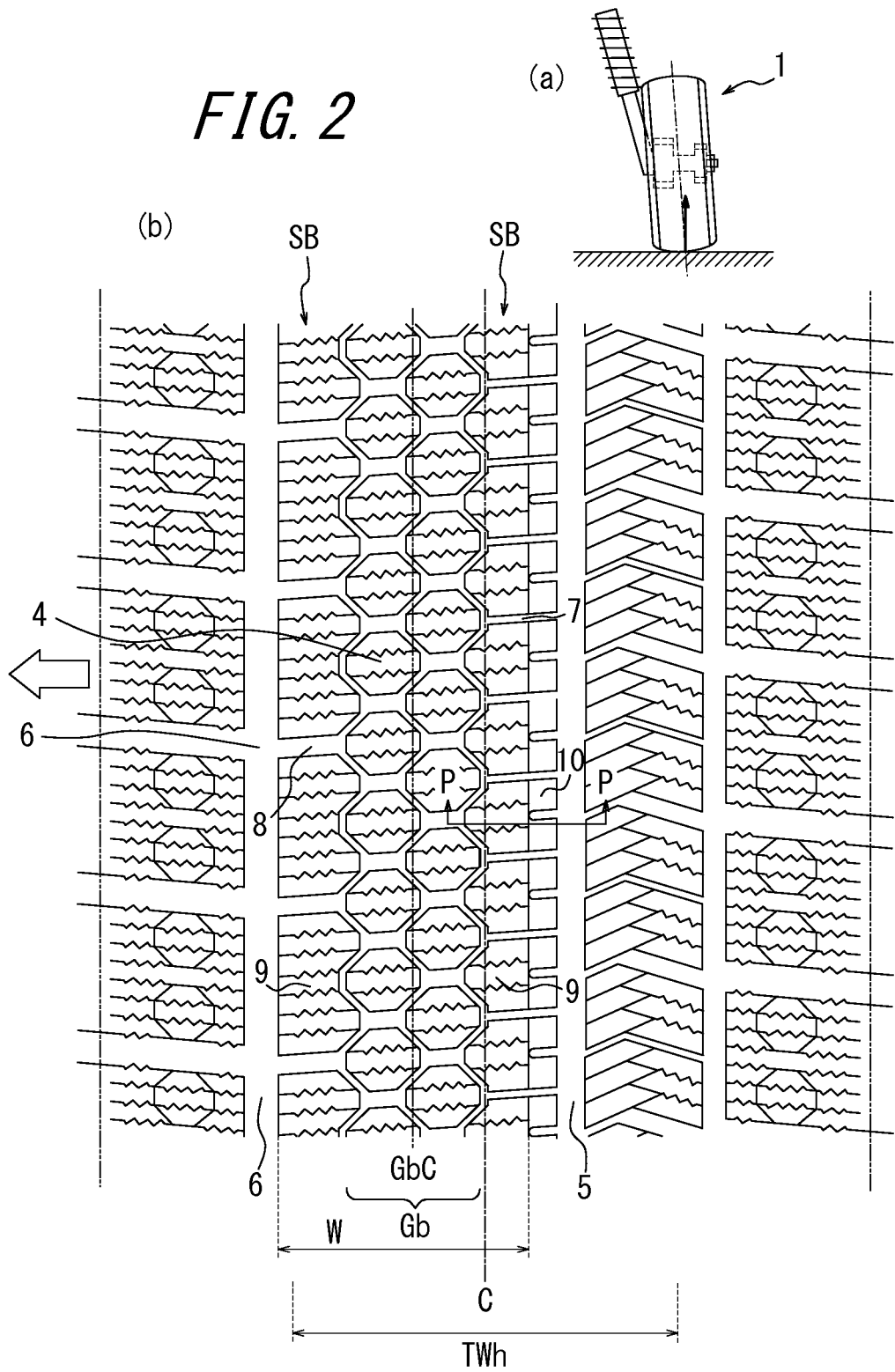
FIG. 2(a) is a schematic view showing a negative camber state of an installed tire.
FIG. 2(b) is a partial exploded view showing the embodiment of the tread pattern of the pneumatic tire in its installed state as shown in FIG. 2(a)

More specifically as shown in FIG. 2(b), in case of the negative camber, in which the installation direction of the tire is so predetermined that the side indicated by an arrow will be an inner side of an installed tire relative to a vehicle, the group of polygonal blocks Gb should be arranged within the tread region on inner side of a vehicle. Under the negative camber, the tread region on inner side of an installed tire from the tire equatorial plane C is the direct ground-contact region. When the ground-contact region is positioned relatively inside in the vehicle width direction, the straight-ahead driving performance will be influenced accordingly. However, by arranging the group of polygonal blocks within the ground-contact region, the braking/traction performances during straight-ahead driving on icy and snowy roads can be improved thanks to the functions of the polygonal blocks such as the performance on icy and snowy roads and the road hugging property as described above.

Figure 3:
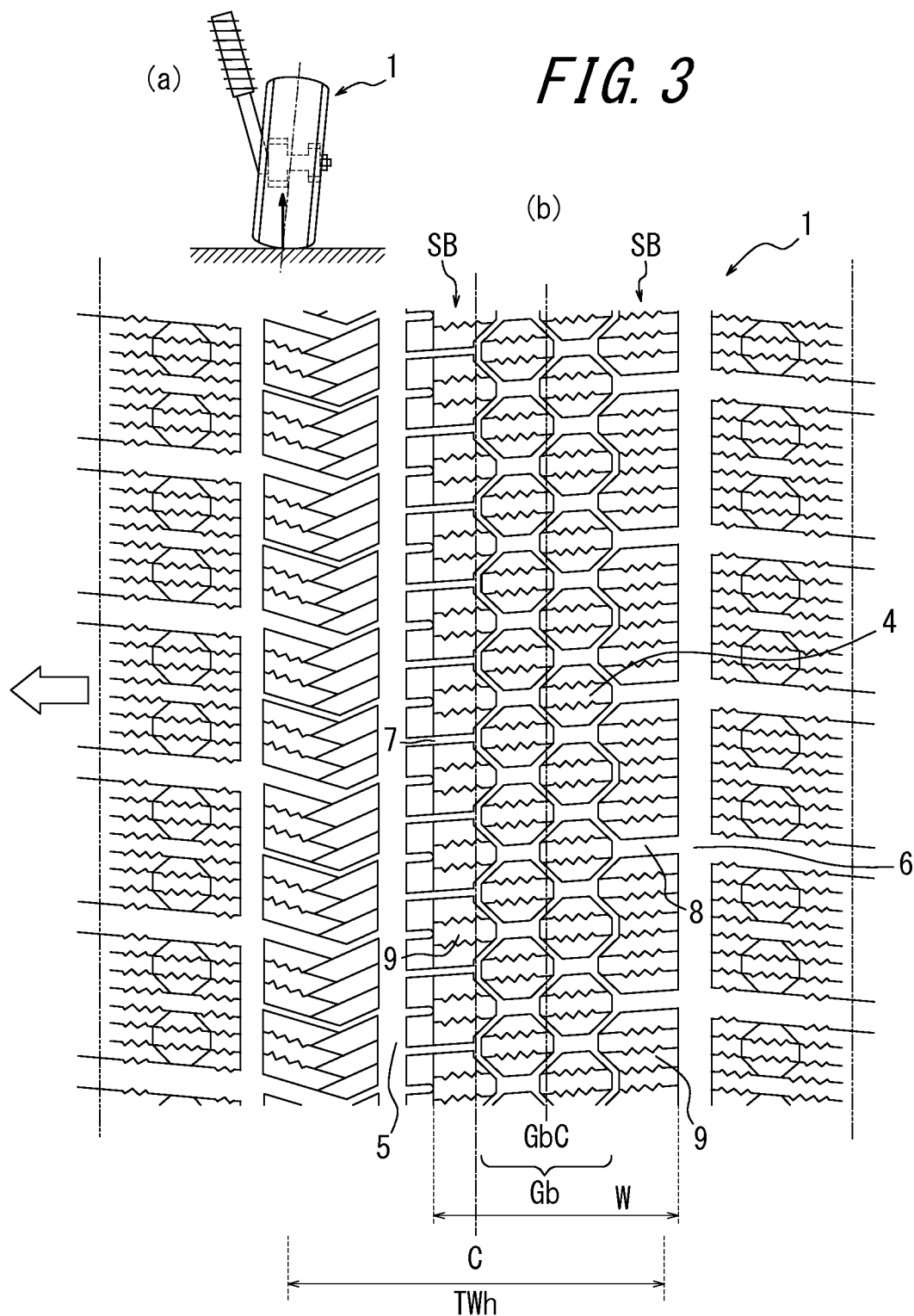
FIG. 3(a) is a schematic view showing a positive camber state of an installed tire.
FIG. 3(b) is a partial exploded view showing the embodiment of the tread pattern of the pneumatic tire in its installed state as shown in FIG. 3(a)

On the contrary as shown in FIG. 3(b), in case of the positive camber, in which the installation direction of the tire is so predetermined that the side indicated by an arrow will be an inner side of an installed tire relative to a vehicle, the group of polygonal blocks Gb should be arranged within the tread region on outer side of a vehicle. Under the positive camber, the tread region on outer side of an installed tire relative to a vehicle from the tire equatorial plane C is the direct ground-contact region. When the ground-contact region is placed relatively outside in the vehicle width direction, the driving performance in cornering will be influenced accordingly. However, by arranging the group of polygonal blocks within the ground-contact region, the performance on icy and snowy roads can be improved thanks to the edging elements increased as above mentioned. The handling performance in cornering will be also improved due to the function of the polygonal blocks having the road hugging property.

In addition, when W is defined as the width of both the group of polygonal blocks Gb and the side block row SB, namely W is the width between the two circumferential main grooves 5, 6 forming the side block 9, 9, it is preferred that W is within a range of 7.5% to 50% of the tread ground-contact width TW, or more preferably within a rang of 15% to 40%.

As described above, it is preferred that the region of the group of polygonal blocks Gb is large enough, because the arranged polygonal blocks 4 can improve the performance on icy and snowy roads effectively. However, there is also a possibility that the hydroplaning performance may deteriorate by the deteriorated drainage performance caused by the dense arrangement of the polygonal blocks across the entire tread surface. Taking the above facts into consideration, it is preferred to arrange the group of polygonal blocks Gb and the side block rows SB within a region of 7.5% to 50% of the tread ground-contact width TW, so as to maintain both the performance on icy and snowy roads and the hydroplaning performance in a well-balanced manner. In case of a region less than 7.5% of the tread ground-contact width TW, it is impossible to improve the performance on icy and snowy roads effectively. And in case of a region over 50% of the tread ground-contact width TW, the hydroplaning performance cannot be secured in a good condition. These performances can be realized more effectively by arranging the group of polygonal blocks Gb and the side block rows SB within a region of 15% to 40% of the tread ground-contact width TW.

It is preferred that the depth of the first narrow groove 3a and the second narrow grooves 3b forming the polygonal blocks 4 is smaller than the circumferential main groove 5, 6. As the ground-contact width of the polygonal blocks 4 is relatively small, the rigidity of the polygonal blocks 4 is low as compared with the rigidity of the side blocks 9. Therefore, by forming the groove depth of the first and second narrow grooves 3a and 3b smaller than the circumferential main grooves 5, 6, the rigidity of the polygonal blocks 4 can be reinforced and thus, it becomes possible to improve the running stability. As a result, the road hugging property of the polygonal blocks 4 is stabilized, thereby realizing the performance on icy and snowy roads of the polygonal block 4 more effectively. As just described, by reducing the depth of the first and second narrow grooves 3a and 3b, the dry performance/wet performance/on-ice performance/on-snow handling performance/on-ice braking performance and performance against uneven wear can be improved mainly.

Figure 4:
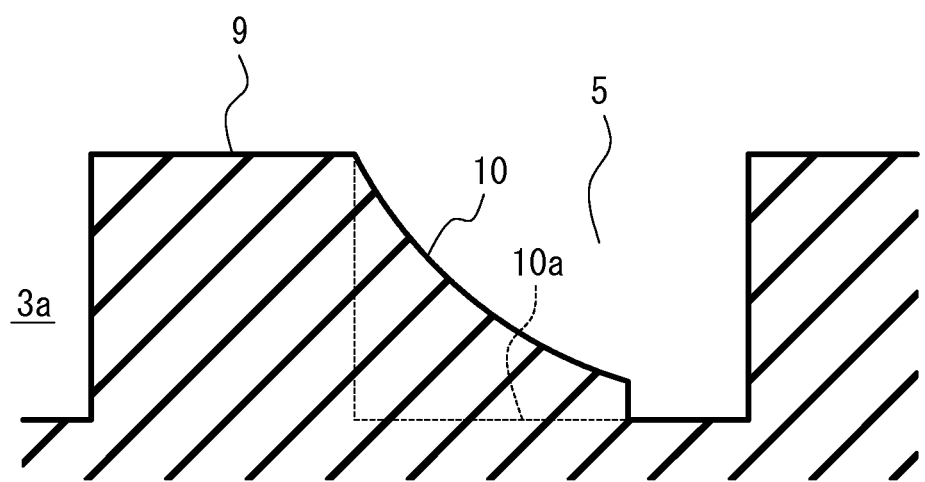
FIG. 4 is a sectional view taken along line P-P line in FIG. 2(b), showing a raised bottom block arranged in a main circumferential groove.
Figure 5:
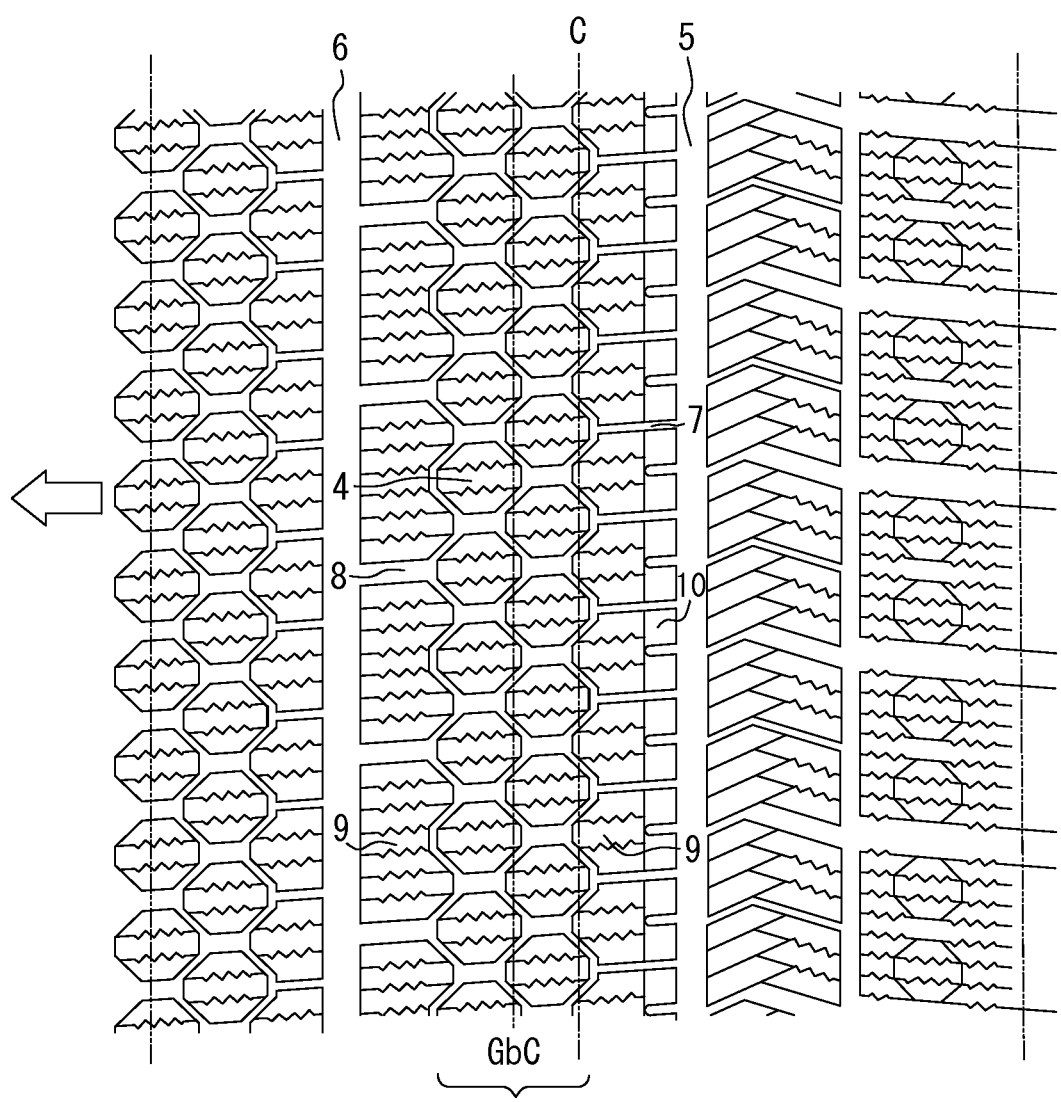
FIG. 5 is a partial view showing the tread pattern of a comparative pneumatic tire.

As shown in FIG. 4, it is preferred to provide a raised bottom block (grooving) 10 in the circumferential main grooves 5, 6 forming the side block 9, 9. FIG. 4 is a sectional view along line P-P in FIG. 2(b). In this embodiment, the raised bottom block 10 is arranged in the circumferential main groove 5, and a pocket 10a is also formed, extending in the tire width direction in the raised bottom block 10.

By means of such a constitution, the block edge is formed in the main groove so that the on-snow performance can be improved especially. And the hydroplaning performance is not deteriorated, as the sufficient width is secured in the opening of the main groove. The raised bottom block can be provided in either one of the circumferential main grooves 5, 6, or in both.

Example 1

The inventor conducted performance evaluation regarding the on-ice and on-snow performances by means of a prototype of an example tire according to the embodiment of the present invention and a conventional tire according to the prior art, also the evaluation concerning uneven wear within the shoulder region of the example tire was carried out. The results will be described in what follows.

The example tire is a radial ply tire for passenger vehicles, having a tire size of 195/65R15 and provided with the group of polygonal blocks and the side block rows shown in FIG. 1. The example tire was comprised of the group of polygonal blocks in a portion of the tread region, formed by closely arranging a plurality of independent blocks defined by the grooves. The surface contour shape of each block is substantially regular octagonal and the dimensions are as below:

| | |
|---|---|
| Width of circumferential main groove 6: | 5 mm |
| Width of circumferential main groove 5: | 12 mm |
| Width of rightmost circumferential main groove: | 7 mm |
| Depth of circumferential main groove: | 9 mm |
| Circumferential length of polygonal block (BL): | 13.0 mm |
| Width of polygonal block (BW): | 15.6 mm |
| Circumferential distance between adjacent polygonal blocks (BGL): | 3.4 mm |
| Widthwise distance between adjacent polygonal blocks (BGW): | 9.5 mm |
| Height of polygonal block (BH): | 7 mm |
| Length of reference Pitch (PL): | 32.9 mm |
| Width of group of polygonal blocks and side block row: | 52.1 mm |
| Ground-contact width ratio of polygonal block: | 32% |
| Width of central side block: | 14.9 mm |
| Width of outside side block: | 28.8 mm |
| Area of polygonal block: | 154 mm$^2$ |
| Widthwise center of group of polygonal blocks: | 17.5 mm* |
| (Center of the half-width tire from the equatorial plane): | 40 mm |

*)toward the inner side of a vehicle from the equatorial plane

This example tire was installed on a vehicle, wherein the widthwise center of the group of polygonal blocks was positioned on inner side of an installed tire relative to a vehicle, and then the evaluations for performances of on-ice braking/traction and on-snow braking/traction were conducted.

Example 2

Next, the same tire with Example 1 was installed at a vehicle, wherein the widthwise center of the group of polygonal blocks was positioned on outer side of an installed tire relative to a vehicle, and then the evaluations for performances of on-ice cornering/braking and on-snow cornering/braking were conducted.

Figure 6:
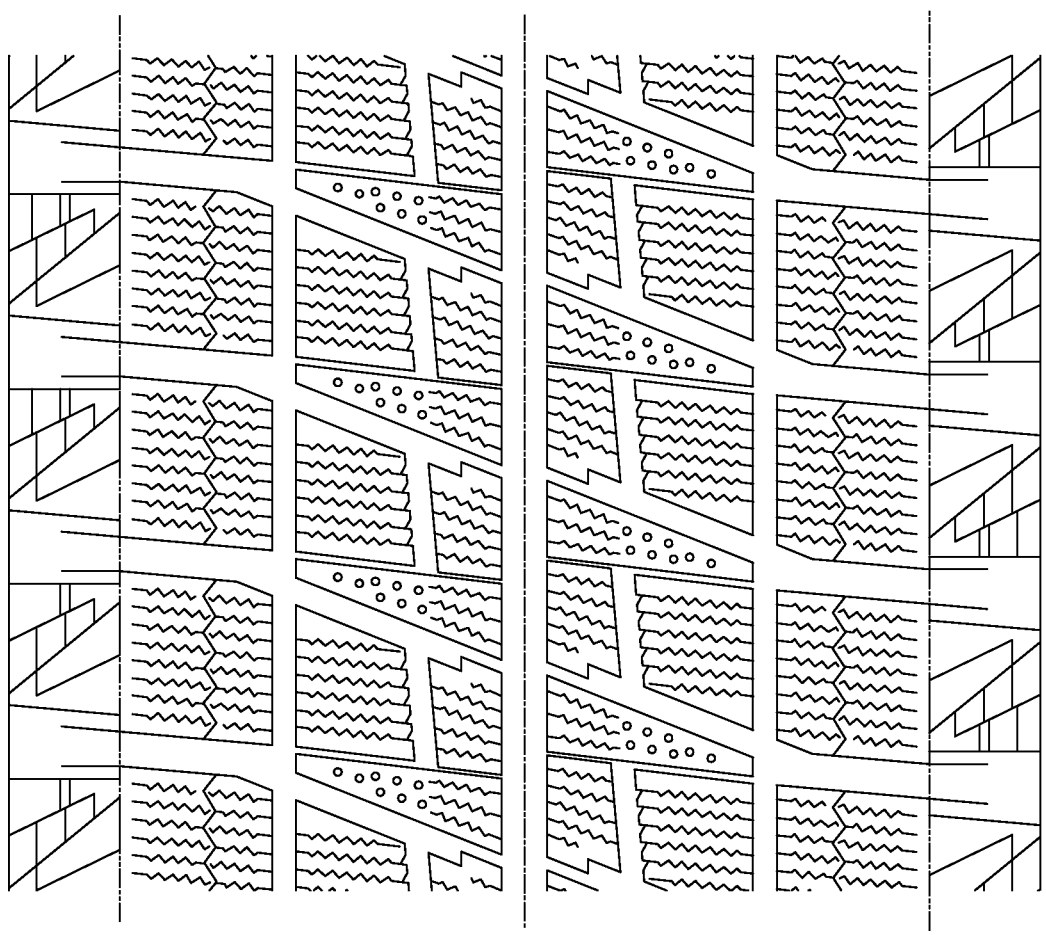
FIG. 6 is a partial view showing the tread pattern of a conventional pneumatic tire.

The conventional tire was provided with a tread pattern shown in FIG. 6. The widths of the both circumferential main grooves positioned outside in the tire width direction were 5 mm, and the width of the circumferential main groove inside in the tire width direction was 9.5 mm. Other constitutions remained equivalent to those of the example tire.

TABLE 1

| | EXAMPLE 1 | EXAMPLE 2 | CONVENTIONAL TIRE |
|---|---|---|---|
| On-ice braking | 112 | 110 | 100 |
| On-ice traction | 110 | — | 100 |
| On-ice cornering | — | 118 | 100 |
| On-snow braking | 108 | 106 | 100 |
| On-snow traction | 109 | — | 100 |
| On-snow cornering | — | 108 | 100 |

The parameters indicated in Table 1 are:
On-ice braking: an index of a measured braking distance in fully braking at running with 20 km/h on a freezing road surface at a test course.
On-ice traction: an index of a measured time between starting and accelerating on a freezing road surface at a test course.
On-ice cornering: an index of a measured value of the general feeling evaluation for performances such as braking, startability, straight-ahead driving and cornering on a freezing road surface at a test course.

On-snow braking: an index of a measured braking distance in fully braking at running with 40 km/h on a compacted snowy road surface at a test course.

On-snow traction: an index of a measured interval time in accelerating from first 10 km/h to 45 km/h on a compacted snowy road surface at a test course.

On-snow cornering: an index of a measured value of the general feeling evaluation for performances such as braking, startability, straight-ahead driving and cornering on a compacted snowy road surface at a test course. In the evaluation of Table 1, the larger the number was, the more the on-ice and on-snow performances were improved, based on the index 100 of the conventional tire.

Table 1 shows the test results of the example tires having the group of polygonal blocks and the side block rows in one portion of the tread surface. Example 1 comprising the group of polygonal blocks and the side block rows on the inner side of the installed tire was superior to the conventional tire, particularly in terms of the on-ice and on-snow braking and traction performances, while Example 2 having the group of polygonal blocks and the side block rows on the outer side of the installed tire was superior to the conventional tire, especially in terms of on-ice and on-snow braking and cornering performances.

In addition, it was visually evaluated if uneven wear occurred in the shoulder regions of the example tires after being tested under the above conditions. And no uneven wear was confirmed in the shoulder regions both of Example 1 and 2 by this evaluation. For comparison, a tire having the polygonal blocks arranged in the shoulder region on inner side of a vehicle when installed (hereinafter referred to as "Comparative tire") was prepared to evaluate the uneven wear performance in the shoulder region. This evaluation was carried out by measuring an amount of heel-and-toe wear after running a dry surface normal road for 5000 kilometers in various driving modes. The measured values are shown as index values based on the index of the conventional tire as being 100. Table 2 shows the results as below:

TABLE 2

| | EXAMPLE 1 | EXAMPLE 2 | COMPARATIVE EXAMPLE |
|---|---|---|---|
| Uneven wear | 100 | 100 | 94 |

As a result, uneven wear was confirmed in the shoulder region of the Comparative tire.

The surface contour shape of the polygonal blocks 4 arranged within the tread ground-contact width is preferably a polygonal shape having not less than five sides. This shape makes it possible to secure the sufficient ground-contact width on a tire surface. Also by means of this shape, each polygonal block can move independently, while supporting adjacent blocks mutually so as prevent buckling.

As shown in FIG. 1, it is more preferred that the surface contour shape of the polygonal block 4 is substantially equilateral-octagonal. When having fewer sides, the blocks cannot buckle in various directions due to the insufficient flexibility. In case of polygons having 8 sides or more, each side becomes so short that a surface area touching the adjacent blocks becomes too small to support mutually when buckling. Therefore, when a surface contour shape is substantially equilateral-octagonal, the block can buckle in various directions and support the adjacent blocks sufficiently. In case a surface contour shape is equilateral-octagonal, the first narrow groove 3a forming the polygonal blocks 4 shall have a sufficient circumferential distance so that the first narrow groove 3a will not be closed by the adjacent blocks when contacting with the ground. Meanwhile, the second narrow groove 3b crossing the first narrow groove 3a and inclining against the equatorial plane C shall be so narrow that the closely-spaced adjacent blocks will obstruct the second narrow groove 3b when contacting with the ground. A surface contour shape of the polygonal block according to the present invention is not limited by the above mentioned shapes but can be in such a shape, in which each polygonal block defined by the grooves can move freely and independently without being restrained mutually by the adjacent polygonal blocks, thereby having the sufficient flexibility when contacting with the ground.

Also, the arrangement and shape of the polygonal blocks and the side blocks in the above examples have been presented only by way of example and other embodiments can be realized also. Each number of the block rows and the blocks, each shape and size etc. of the blocks remains just as one embodiment for explaining a tire according to the present invention and it should be noted that these can be changed arbitrarily without departing from the scope of the present invention.

INDUSTRIAL APPLICABILITY

According to the present invention, by forming the block shape and arrangement according to the purpose of use and the conditions of an installed tire, it can be possible to improve the performance on icy and snowy roads while securing various performances, and also to prevent uneven wear in the shoulder region.

REFERENCE SYMBOLS

1 Tire
2 Ground-contact edges
3a, 3b Narrow grooves
4 Polygonal blocks
5, 6 Circumferential main grooves
7, 8 Widthwise grooves
9 Side blocks
10 Raised bottom block
W Width of polygonal block group Gbs+Side block rows SB
C Equatorial plane
Gb Polygonal block group
GbC Widthwise center of the group of polygonal blocks
GbW Width of the group of polygonal blocks
SB Side block rows
TW Ground-contact width of the tread
TWh 50% wide region of tread ground-contact width

The invention claimed is:

1. A pneumatic tire comprising two circumferential main grooves within a tread ground-contact width, and a group of polygonal blocks between the two circumferential main grooves, in which the group of polygonal blocks is comprised of a plurality of polygonal blocks arranged in at least two longitudinal rows in a tire circumferential direction and in a plurality of transverse rows in a tire width direction, the polygonal blocks each having not less than five sides and being defined by narrow grooves, wherein:

the polygonal blocks in the adjacent longitudinal rows are arranged so as to be staggered from each other in the tire circumferential direction; and the group of polygonal blocks having a widthwise center that is positioned within a fifty-percent-wide region of the tread ground-contact width across a tire equatorial plane, and including side block rows each comprised of a plurality of side blocks defined by the circumferential main grooves, widthwise grooves and the narrow grooves and arranged in the tire circumferential direction, the side block rows being arranged on both sides in the tire width direction across the group of polygonal blocks respectively, the side blocks are formed so as to have a larger ground-contact area compared with the polygonal blocks, the ground-contact areas of the side blocks arranged on both sides of the group of polygonal blocks have a different dimension respectively, the side blocks arranged in the outer side in the tire width direction within the blocks on both sides across the group of polygonal blocks have a larger ground-contact area.

2. A pneumatic tire according to claim 1, wherein the widthwise center of the group of polygonal blocks is arranged to be offset relative to the tire equatorial plane.

3. A pneumatic tire according to claim 1, wherein the group of polygonal blocks is arranged only in either one of half-tread-width regions.

4. A pneumatic tire according to claim 1, wherein an installation direction of the tire is predetermined and the widthwise center of the group of polygonal blocks of an installed tire is positioned within the half-tread-width region on inner side of a vehicle.

5. A pneumatic tire according to claim 1, wherein an installation direction of the tire is predetermined and the widthwise center of the group of polygonal blocks of an installed tire is positioned within the half-tread-width region on outer side of a vehicle.

6. A pneumatic tire according to claim 1, wherein the group of polygonal blocks and the side block rows each has a width in the tire width direction, which is within a range of 7.5% to 50% of the tread ground-contact width.

7. A pneumatic tire according to claim 1, wherein the narrow groove defining the group of polygonal blocks is shallower than the circumferential main groove.

8. A pneumatic tire according to claim 1, wherein each polygonal block has an actual ground-contact area that is within a range of 50 mm$^2$ to 250 mm$^2$.

9. A pneumatic tire according to claim 1, wherein the group of polygonal blocks has a block density S with reference to a unit actual ground-contact area, as represented by a number "a" of the polygonal blocks within a reference area of the group of polygonal blocks, the reference area being defined by a reference pitch length PL (mm) and a width GbW (mm) of the group of polygonal blocks; wherein the block density S is expressed as:

$$S = a/(PL \times GbW \times (1-N/100))$$

where N (%) is a negative ratio within the reference area; and wherein the block density S is within a range from 0.003 piece/mm$^2$ to 0.04 piece/mm$^2$.

10. A pneumatic tire according to claim 1, wherein at least one of the circumferential main grooves includes a block with a raised bottom.

* * * * *